United States Patent [19]
Senturia et al.

[11] 3,747,755
[45] July 24, 1973

[54] APPARATUS FOR DETERMINING DIFFUSE AND SPECULAR REFLECTIONS OF INFRARED RADIATION FROM A SAMPLE TO CLASSIFY THAT SAMPLE

[75] Inventors: Stephen D. Senturia, Newton Centre; David G. Wilson, Cambridge, both of Mass.; Paul Frank Windkler, Jr., Middlebury, Vt.

[73] Assignee: Massachusetts Institute of Technology, Cambridge, Mass.

[22] Filed: Dec. 27, 1971

[21] Appl. No.: 212,607

[52] U.S. Cl. .......................... 209/111.5, 250/83.3 H
[51] Int. Cl. ............................................. B07c 5/34
[58] Field of Search ................ 209/111.5, 74, 74 M; 250/83.3 H

[56] References Cited
UNITED STATES PATENTS

| | | | |
|---|---|---|---|
| 3,675,769 | 7/1972 | Story .............................. | 209/111.5 |
| 3,137,757 | 6/1964 | Martin et al. .................. | 250/83.3 H |
| 3,517,190 | 6/1970 | Astheimer ...................... | 250/83.3 H |
| 3,471,698 | 10/1969 | Mausteller et al. ............ | 250/83.3 H |
| 3,058,388 | 10/1962 | Ogden, Jr. ..................... | 250/83.3 H |
| 3,109,932 | 11/1963 | Spitzer .......................... | 250/83.3 H |

*Primary Examiner*—Allen N. Knowles
*Attorney*—Arthur A. Smith, Jr., Robert Shaw et al.

[57] ABSTRACT

Apparatus operable to subject a sample to a broad-spectrum of radiation and to measure diffuse and specular reflected radiation from the sample to serve as a basis for classifying that sample. The radiation reflected from the sample ordinarily contains a number of wavelengths. The relative intensities of the radiation reflected from the sample at several wavelengths form a signature which identifies that radiation as belonging to a typical reflection from a particular group of materials. The signature is analyzed in apparatus employing the present inventive concept. The analyzing mechanism includes a digital computer which receives conditioned data from radiation sensors and categorizes the data on the basis of information known about test samples to provide an output which is fed to a classifier wherein mathematical calculations are performed to identify the signature as one emanating from a particular class of materials.

16 Claims, 3 Drawing Figures

APPARATUS FOR DETERMINING DIFFUSE AND SPECULAR REFLECTIONS OF INFRARED RADIATION FROM A SAMPLE TO CLASSIFY THAT SAMPLE

This invention is made in the course of work performed under a contract with the U.S. Department of Health, Education and Welfare.

The present invention relates to systems wherein a sample material to be analyzed is subjected to infrared radiation and diffuse and specular reflections from the sample are analyzed to classify the sample.

The particular use in connection with which the present invention described in greatest detail in the instant disclosure is one in which the system discussed is employed in the sorting of municipal solid waste. Some background information relating to the same use is contained in an application for U.S. Letters Patent, Ser. No. 120,657, filed by Wilson (one of the present inventors) and another on Mar. 4, 1971. The subject matter of the present disclosure is contained in a thesis entitled "An Infrared Sensor for Automated Solid Waste Reclamation" submitted as partial fulfillment of the requirements of the degrees of Bachelor of Science and Master of Science by Kendall H. Lewis to the Department of Electrical Engineering at the Massachusetts Institute of Technology in May, 1971 (and deposited in the M.I.T. library system on June 28, 1971), the work which led to the thesis being done under physical supervision of Stephen D. Senturia, the associate supervision of David G. Wilson, and with the consultation of P. Frank Winkler, the present inventors. Without going into any further detailed comment at this juncture on the problems encountered in the separation of solid waste, by way of addition to those noted in the references just mentioned, it is sufficient to note that it is an object of the present invention to provide a sensor and a system employing the sensor for use in sorting apparatus, wherein diffuse and specular radiation from a sample are employed to give a signature which indicates the category of materials within which the sample is included.

A further object is to provide in such system apparatus operable to analyze the signature thus obtained.

A still further object is to provide classification apparatus which is self-learning by nature.

These and still further objects are contained in the descriptive portion of the specification to follow and are particularly delineated in the appended claims.

The objects of the invention are embodied in apparatus for determining diffuse and specular reflections of infrared radiation from a sample to classify that sample as belonging to one set of categories. The apparatus includes a source of infrared radiation which may be provided by a Globar element, a Nernst glower, a tungsten filament, or the like. The radiation emitted by the source is directed upon a mirror or prism or some similar device which in turn directs the radiation upon the sample, the reflection from the sample being collected and focused by a further mirror or the like and being directed through filters or the like onto a pickup sensor which provides an output signal representative of the intensity of the radiation at each of a predetermined set of wavelengths. The intensities at said set of wavelengths, so determined, provide a signature for classification of the particular sample. Means is provided for classifying the sample into one of a set of categories on the basis of the signature thus obtained; the last-named means in the embodiment hereinafter discussed is a digital computer and analog computer in combination.

The invention is described hereinafter upon reference to the accompanying drawing, in which;

FIG. 3 shows schematically apparatus adapted to generate infrared radiation, to direct that radiation upon a sample to be classified and to analyze diffuse and specular radiation from said sample.

In the discussion to follow, this and the next several paragraphs are devoted to a general description of the invention, the more particular aspects bing left to later paragraphs. Because there is no single physical measurement or process capable of producing complete separation of mixed rubbish into component categories, a separation plant has to include a complex of distinct but related operations. The way objects are treated for ultimate classification will depend first on their size, second on their degree of aggregation, and finally on other properties as deduced either from their mechanical properties or from physical measurements performed upon them. Thus, in addition to any conveyors, vibrating screens, hoppers or other relatively standard mechanical-handling equipment, it is necessary to have special-purpose mechanical devices for separation and special sensors for performing physical measurements.

It is envisaged that in one part of a separation plant, rubbish to be classified will be spread out along a conveyor system so that items are physically separated from one another. The conveyor system will carry these pieces of rubbish past, first, a series of sensors and, second, deflecting, mechanisms for sorting the main trash stream into several streams. The precise arrangement of sensors and switches will depend not only on the relative probabilities of finding the various useful components in the trash stream, but also on the kinds of outputs each sensor is capable of producing. Work done to date by the present inventors has been concentrated on the problem of treating objects in the size range with diameters from a few inches up to about a foot, this size range accommodating a major fraction of municipal refuse.

Figure 1:
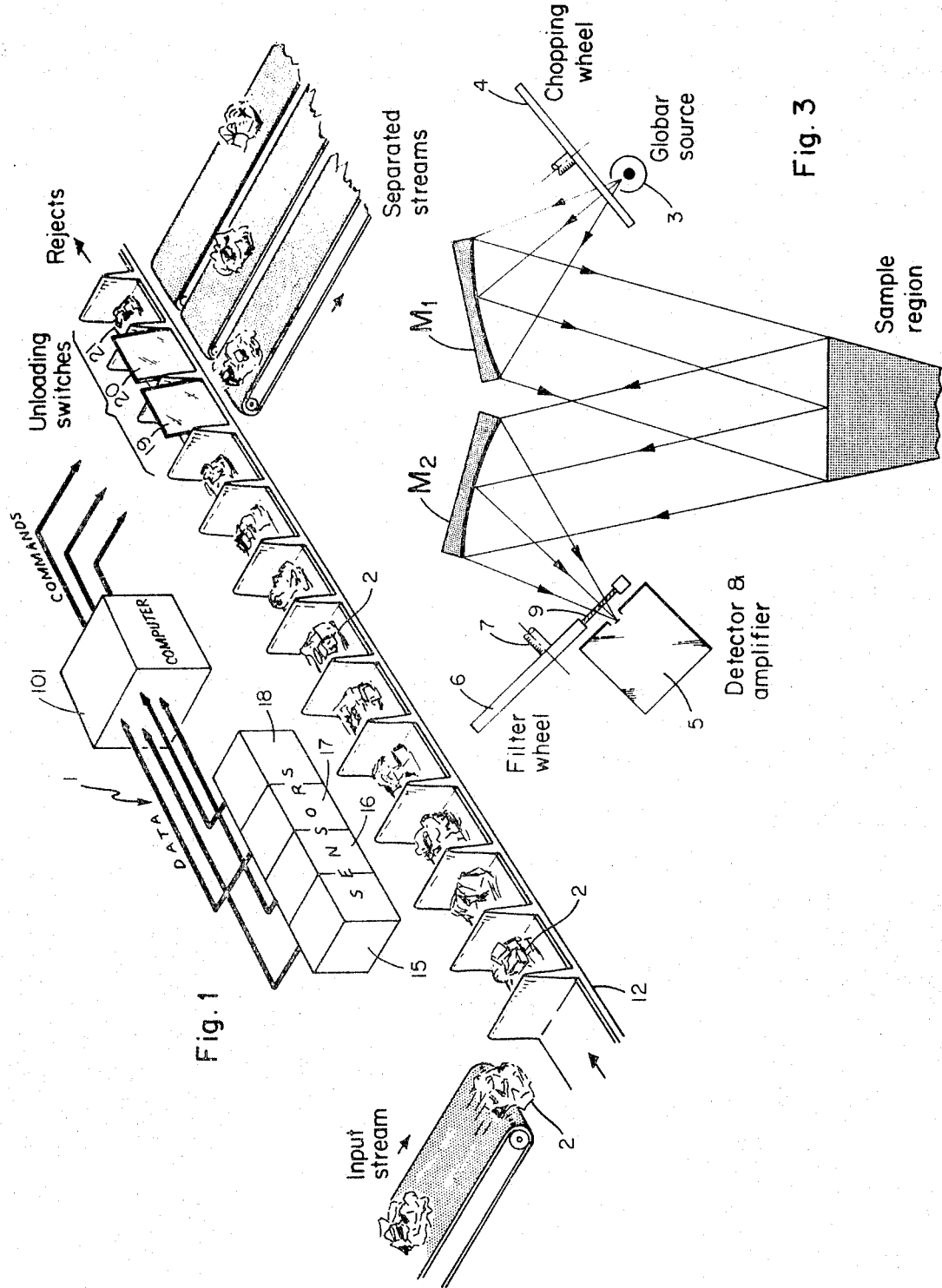
FIG. 1 is an isometric schematic representation showing a portion of a rubbish-separating plant.

FIG. 1 shows a schematic representation of a portion of a separating plant 1. Objects or samples 2 are dropped from the input stream conveyor onto a pan conveyor 12 which passes under a plurality of sensors 15, 16, 17 and 18. The sensors make continuous readings, and feed the data obtained to a computer 101 which keeps track of which set of data goes with which pan and processes the data to control unloading switches 19, 20 and 21. Items which defy classification are rejected as shown. Assuming a pan-conveyor speed of 5 feet per second and a pan size of 1 foot, each sensor will have a maximum of 0.2 seconds to look at the contents of a pan and relay the information to the computer. At this 5-feet-per-second speed, assuming each pan carries on the average one pound of rubbish, the total throughput of the system is about 9 tons/hour, or 115 tons/day (two shifts) allowing 20 percent down time for maintenance.

The success or failure of this kind of plant will depend in large measure on the development of sophisticated sensors capable of identifying enough valuable rubbish components to make the operation economical. Almost all existing sensors are binary in nature, providing data for separation into only two kinds of categories. Familiar examples are the magnetic-band separator (which does the coding and separating in one operation) and the conductivity sensor (metal detector). A wide variety of binary-sensor/separator machines have been built for uses as diverse as sorting ores, and removing the stones that get mixed in with harvested potatoes. Because binary sensors provide only two possible outputs, it takes at least three different, independent binary variables to afford separation into eight classes. Furthermore, the contamination of readings due to the mixed nature of the rubbish being examined and the likelihood that the information provided by different sensors will be somewhat redundant, indicate that it will take many more than three binary sensors to provide enough data for reliable separation into eight classes. Present efforts, therefore, have been specifically directed towards the development of sensors with multiple — or signature-type outputs, i.e., sensors which can code rubbish into several possible classes from a single set of readings.

There are at least two different approaches that can be taken toward the sensor problem. In the case of binary sensors, it is known with great precision the characteristics of the things to be separated from all the rest. This fact enables the binary sensor to be designed using very specific properties of the desired component. In the case of multiple output sensors, however, allowance must be made for as many diverse components as possible. A useful approach to this problem, and the one taken here, is to excite the object being tested in such a way that every object gives some kind of response, or signature. A library of such signatures is assembled from different test samples. Using pattern-recognition methods, or learning machines, an algorithm is developed which will correctly classify each test material from its signature. This same algorithm is then used to process signatures from unknown samples.

The impact sensor described in said application provides a signature-type output. The present disclosure is concerned with another form of sensor which also gives a signature-type output, this being by virtue of radiation reflected by the samples or objects 2 in FIG. 1. The signature discussed herein is made up of four reflected wavelengths and the particular sample being classified is identified on the basis of the intensity of each of the four wavelengths, it being pointed out that more and different wavelengths could be used in more sophisticated apparatus than that discussed.

Turning now to FIG. 1, apparatus is shown at 1 for determining diffuse and specular reflections of infrared radiation from a sample 2 to classify that sample as belonging to one of a set of categories. A source of infrared radiation 3 in FIG. 3 serves to provide the infrared radiation which eventually is impinged upon and reflected by each sample 2. Radiation from the source 3 is chopped by a chopping wheel 4, later discussed herein, and the chopped radiation is directed onto a mirror $M_1$ which collimates and directs the radiation upon the sample 2, as shown. The mirror $M_1$ can be an off-axis paraboloidal mirror, but work done indicates that a spherical mirror, which is much less expensive than the other, serves adequately for present purposes. The radiation reflected from the sample is picked up by a further mirror $M_2$ which acts to reflect and focus the radiation upon a detector and amplfiier 5, the focused radiation first passing through a a filter wheel 6. The discussion herein is concerned with a system wherein four wavelengths of infrared radiation are employed in the analyses. The wavelengths are selected in sequence by the filter wheel 6 which is a rotatable disc containing four narrow-band optical filters. The filter wheel 6 rotates in a plane orthogonal to the figure plane in FIG. 3 upon rotation of the shaft designated 7 driven by an electric motor or other means not shown to bring a series of four filters into the focused beam. One of such filters is shown in FIG. 3 and is there designated 9; the filters are positioned around the wheel at 90° intervals and are brought into the beam sequentially as the wheel 6 rotates.

The detector in the element labeled 5 is a photodetector, of which quantum and thermal sensitive devices are available. The quantum type is preferred because of its faster response time and greater sensitivity. A quantum detector consists of a semiconductor wherein electrons are excited from the valence band to the conduction band by incident radiation being absorbed. This effect can be used to create a change in conductivity of the semiconductor or to generate a voltage across a p-n junction diode. The first device is called a photoconductor and the second a photodiode. In both types the wavelength response of the detector is determined by the bandgap of the semiconductor. The choice of detector is determined by the set of wavelengths making up the signature. For example, in the work reported herein, detectors employed are sensitive in the wavelength region between 2.5 and 3.8 microns; in fact, InSb and PbSe devices are used. A wide variety of commerical detectors are available to sense other wavelengths; indeed both InSb and PbSe are useful for wavelengths other than the two given. The output of the detector at each wavelength is a voltage signal which is representative of the intensity of the radiation at the wavelength. As each filter is brought into position in the reflected beam the output of the detector is a voltage signal with a peak amplitude which is representative of the intensity of the reflected radiation at the wavelengths passed by that particular filter. The rotation of the filter wheel thus causes the amplitude of the detector output signal to vary according to the relative intensities of the reflected radiation at the set of four wavelengths. It is this set of four voltage amplitudes which make up the signature which can be analyzed to classify the sample. The output voltage from the detector is amplified as a first step in signal conditioning; it is not believed that any further discussion need be made of a particular amplifier for such purpose, but it is pointed out that details of amplification circuitry including particular values of the elements are included in said thesis.

The system described in the previous paragraph contains filters in combination with detectors to indicate intensity or radiation at particular wavelengths. The four filters and the apertured filter wheel 6 can be replaced by diffraction means such as, for example, a pivotable diffraction grating positioned to direct diffracted radiation at a predetermined set of wavelengths onto an appropriate detector. It will be appreciated that the position of the rotating wheel 6 (or the angular position of the grating) must be correlated with the voltage signal out of the detector in order that analyzing circuitry will know which particular wavelength is represented by the detector output voltage. Such correlation can be provided by the use of four slots cut in the filter wheel to pass light only when a particular filter is in position, a lamp and photo-transistor being used to note when a particular slot passes a predetermined position. The output from the photo-transistor is used to correlate the amplitude of the voltage signal with a particular filter.

A detailed analysis of signature recognition is made in later paragraphs. The mechanism by which such analysis is made is the computer designated 101 in FIG. 1, which consists of the digital computer shown at 102 in FIG. 2, and there-called a "learning machine," and of the analog circuitry shown in block diagram form at 103, and there being designated "classifier." The computer 101 accepts signatures from a set of test samples and produces, using methods of pattern recognition, a classifying program for identifying the category to which each test signature belongs. The actual analysis of the operation is carried out in the analog circuitry 103 which performs the mathematical calculations in the classifying programs. The mathematics upon which the analysis is based is contained in the next several paragraphs.

In order to use a signature to code or classify a piece of rubbish, it is necessary to have an algorithm which can operate on the list of four or five numbers making up the signature and produce a classification decision. Pattern-recognition methods, of which there are many in the published literature, are directly applicable to this problem. A simple pattern-recognition method, employed in connection with the work reported herein is outlined below.

Suppose the signature provided consists of $k$ numbers ($k$ equals four here). These $k$ numbers can be thought of as comprising the components of the $k$-dimensional vector, $x$. Suppose, further, it is wished to classify this vector $x$ into one of R classes. Then for each class $n$, it is necessary to find a discriminant function $f_n(x)$, such that if a particular vector $x_0$ belongs to the mth class, then $$f_m(x_0) > f_n(x_0) \text{ for all } n \neq m. \tag{1}$$

It is possible to find a set of such discriminant functions in a wide variety of cases. The simplest case, and the one which turns out to be useful for present purposes, is when $f_n(x)$ takes the form of an inner product with a weight vector $w_n$. To be more specific, a new $k+1$-dimensional signature vector $y$, is defined such that $$y_j = x_j \text{ for } j = 1,2,k, \text{ and} \tag{2}$$

$y_{k+1} = 1$. Then, for each of the R categories, a weight vector $w_n$ is defined, which is also of length $k+1$. The discriminant function is then $$f_n(x) = w_n \cdot y = \sum_{j=1}^{k} w_j x_j + w_{k+1} \tag{3}$$

It is seen from the equation (3) that the addition of the extra dimension simply allows for an additive constant, $w_{k+1}$ in each discriminant function.

A set of data vectors are said to be linearly separable if there exists a set of R weight factors such that equation (1) is always satisfied for the discriminant functions defined by equation (3). Conversely, if a set of data vectors is linearly separable, then it is possible to define a training sequence which will produce a set of satisfactory weights.

Several of these training routines have been carried out on a digital computer using the data vectors of Table 1 (below) which lists percentage reflectivities at four wavelengths for five different samples of rubbish, as later discussed. The data of Table 1 are found to be linearly separable. The corresponding set of weight vectors is shown in Table 2 (below). If one of the data vectors from Table 1 is taken and multiplied by each row vector in Table 3, the largest vector product will occur for the weight vector belonging to the correct category. Thus, these weight vectors can be used to identify the category from the signature. This means that if either sensor encounters a sample like those used to derive the weight vectors, then use of these weight vectors will correctly classify the material. Thus, the infrared sensor is indeed capable of working as a multiple-output sensor.

Work done to data has involved recording of reflected radiation for a wide range of rubbish samples and the construction of a four-wavelength prototype. The system used originally for such analysis is similar to that shown in FIG. 3. The next few paragraphs give an analysis of a few of the more prominent materials found in commercial rubbish to place the present description in the proper context.

Paper, the primary component of rubbish, was studied first in the above-mentioned work. Two identifiable absorption bands exist in paper. The strongest, at 2.9 microns ($\mu$), is very broad (half-width $0.15\mu$). This band is characteristic of the O-H bond in cellulose. The weaker absorption band, half as intense as the O-H band, is the C-H bond absorption at $3.45\mu$. Further tests on other cellulose products (wood and cotton) showed them to have the same kind of reflectance spectra.

Unpainted metals have reflection spectra which are featureless, being strong specular reflectors in the $2-5\mu$ region with reflectivities of about 35–40 percent. Any diffuse reflection associated with the specular reflection is equally featureless, because the penetration depth of the light into the metal is extremely small.

Painted metals, however, show extremely interesting spectra. A painted soft-drink can, for example, has strong bands at $3.45\mu$ (C-H), $5.88\mu$ (oxides in the pigment), and a weak band at $2.9\mu$(O-H in the binder). Because light reflected from the painted metal surface must pass through the paint, the absorption spectra recorded actually correspond to the normal transmission spectra which would be obtained from the layers of paint. At longer infrared wavelengths, in the $6-10\mu$ range, it is possible to distinguish the different colors, since different pigments show different spectral bands in this range.

Only two kinds of plastics have so far been tested, polystyrene and polyethylene. Both have very strong bands at $3.44\mu$ due to C-H bonds, and no other strong bands in the test region between $2.5\mu$ and $3.8\mu$. The absence of any band around $2.9\mu$ makes possible the immediate separation between paper and these plastics, since all paper products have a strong $2.9\mu$ absorption.

Glass is a good specular reflector. The overall reflection intensity more than doubles between 3.5µ and 2.5µ. This variation of reflected intensity with wavelength makes it possible to distinguish the specular reflection of unpainted metals from that of glass.

In order to reduce the range of possible spectral information to a sample of manageable size, four wavelengths were selected at which calibrated reflectance data were recorded. Two of these (2.9µ and 3.4µ) fall within the O-H and C-H bands, while the other two (2.5µ and 3.9µ) serve as reference wavelengths. Table 1 lists percentage reflectances of these four wavelengths for five different samples of rubbish taken at angles of incidence and reflection equal to thirteen degrees. The data of Table 1 (below) constitute a partial set of basic signatures for the infrared reflectance of rubbish components while the entries of Table 2 are weighting factors derived from equation (3) for the same components, as above noted.

TABLE 1

INFRARED REFLECTANCE DATA

| Sample | Percent reflectance vs. wavelength | | | |
|---|---|---|---|---|
| | 2.5µ | 2.9µ | 3.4µ | 3.9µ |
| Painted metal (soft-drink can) | 32 | 26 | 12 | 39 |
| Styrofoam cup | 1.25 | 1.57 | 0.25 | 1.0 |
| Glass bottle | 2.2 | 1.3 | 1.2 | 0.9 |
| White bond paper | 0.30 | 0.17 | 0.21 | 0.25 |
| Rubber innertube | 0.60 | 0.65 | 0.90 | 0.85 |

TABLE 2

WEIGHT VECTORS FOR INFRARED DATA

| Sample | Weight vectors (rows) | | | | |
|---|---|---|---|---|---|
| | 1 | 2 | 3 | 4 | 5 |
| Painted metal | 0.61 | 0.485 | −0.144 | 2.311 | −1.9 |
| Styrofoam | 0.61 | 0.942 | −0.217 | 0.363 | −0.2 |
| Glass | 0.99 | 0.333 | 0.436 | 0.071 | −0.2 |
| Paper | −2.45 | −2.175 | −0.675 | −3.25 | 2.4 |
| Rubber | 0.24 | 0.415 | 0.6 | 0.505 | −0.1 |

Figure 2:
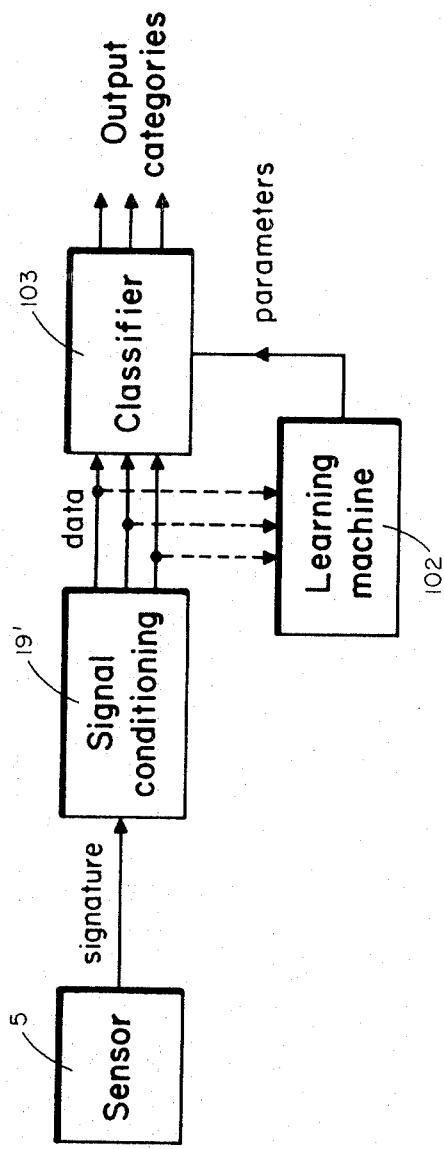
FIG. 2 is a flow diagram of the sensing and classifying portion of the representation in FIG. 1.

Referring to FIG. 2, the detector and amplifier 5 of FIG. 3 is labeled "sensor," it being understood that both designations are intended to designate identical apparatus. The output of the sensor 5 is indicated to be a signature and is fed as an input to a signal conditioning unit 19', the output from which passes to the learning machine 102 and the classifier 103. The function of the learning machine, which is a digital computer in the present apparatus, is to provide a program for the classifier. The data input to the classifier from the signal-conditioning unit 19' is then interpreted by the classifier, which is an analog computer in the present apparatus, in accordance with the program fed into the classifier by the learning machine 102. The signal-conditioning unit 19' is in fact a voltage detector which accepts the voltage output from the sensor 5 (which is a chopped output, as before explained), senses the amplitude and correlates it with wavelength to provide meaningful data input to the learning machine and to the classifier. The output of the classifier provides signature-derived signals to the various unloading switches noted in FIG. 1 thereby determining upon which particular conveyor a sample or object will be unloaded on the basis of the classification of that object. In contemplated designs the functions of both the learning machine and the classifier will be performed by a single digital computer.

Most photodetectors function best with a periodically interrupted, or "chopped," radiation source. This permits the use of a-c coupled amplifiers which eliminate constant voltage offsets. The chopping is performed by the chopping wheel 4, and, in the experimental work done, this wheel was driven synchronously at 3600 RPM to achieve a 1,048 Hz chopping rate. The foregoing discussion of the function performed by the filter wheel 6 and detector and amplifier 5 can be performed by diffraction gratings and the like, and the focusing and collimating function can be performed by the use of prisms.

Also, the discussion has been concerned with classification of rubbish, but it should be pointed out that the apparatus and the method discussed herein have use in connection with other forms of classifications, as for example, those used in the ore separation industry, the food industry and the like.

Other modifications of the invention herein described will occur to persons skilled in the art and all such modifications are deemed to be within the spirit and scope of the invention as defined in the appended claims.

What is claimed is:

1. Apparatus for determining diffuse and specular reflections of infrared radiation from a sample to classify that sample as belonging to one of a set of categories, that comprises: a source of infrared radiation, means operable to direct the radiation upon a particular sample which reflects the same as a diffuse and/or specular reflection, means for collecting the reflected radiation, means for determining the intensity of the reflected radiation at a predetermined set of wavelengths, the intensity of the reflected radiation in the set of wavelengths so determined providing a signature for classification of the particular sample, said means for determining the intensity of reflected radiation including detector means positioned to receive said radiation and adapted to provide a voltage signal the level of which indicates the intensity to which the detector is exposed and which further includes means to correlate said voltage signal from the detector means with the particular wavelength of radiation being detected, means for storing each said voltage signal to provide a set of signals which together constitute said signature for the sample being analyzed, and means for classifying the sample into one of a set of categories on the basis of the signature thus obtained.

2. Apparatus as claimed in claim 1 in which the means for determining the intensity of the radiation at the predetermined set of wavelengths comprises pivotable diffraction means with means for pivoting said diffraction means to a pre-determined set of positions, and in which said detector means is positioned to receive said radiation diffracted by the diffraction means.

3. Apparatus as claimed in claim 2 that further includes computer means programmed to recognize said signature.

4. Apparatus as claimed in claim 3 in which the computer means accepts signatures obtained from a set of test samples and produces, using methods of pattern recognition, a classifying program for identifying the category to which each test signature belongs and which contains means for processing the signature from an unknown sample with the same program thereby to classify the unknown sample.

5. Apparatus as claimed in claim 4 in which the computer means includes a general-purpose digital computer.

6. Apparatus as claimed in claim 5 in which the computer means for classifying the set of test signatures is a general purpose digital computer and in which the computer means for processing the signature from an unknown sample is an analog circuit operable to carry out in analog circuitry the mathematical calculation performed in the classifying programs.

7. Apparatus as claimed in claim 1 in which the means for determining the intensity of the reflected radiation at the predetermined set of wavelengths includes: a set of infrared filters positioned to receive the radiation from the means for collecting, each of the filters having the ability to transmit infrared radiation within a narrow band of wavelengths, means operable to bring the filters sequentially into the path of the radiation from the means for collecting, and detector means positioned to receive radiation that passes through each of said filters.

8. Apparatus as claimed in claim 7 and in which the set of filters is positioned on an apertured rotating wheel, one such filter being located at each aperture and being brought into the path of the radiation from the means for collecting by rotation of the wheel.

9. Apparatus as claimed in claim 7 that further includes computer means programmed to recognize said signature.

10. Apparatus as claimed in claim 9 in which the computer means accepts signatures obtained from a set of test samples and produces, using methods of pattern recognition, a classifying program for identifying the category to which each test signature belongs and which contains means for processing the signature from an unknown sample with the same program thereby to classify the unknown sample.

11. Apparatus as claimed in claim 10 in which the computer means includes a general-purpose digital computer.

12. Apparatus as claimed in claim 10 in which the computer means for processing the set of test signatures is a general purpose digital computer and in which the computer means for processing the signature from an unknown sample is an nalog circuit operable to carry out in analog circuitry the math-ematical calculation performed in the classifying programs.

13. Apparatus for determining diffuse and specular reflections of infrared radiation from a sample to classify that sample as belonging to one of a set of categories, that comprises: a source of infrared radiation, means operable to direct the radiation upon a particular sample which reflects the same as a diffuse and/or specular reflection, means for collecting the reflected radiation, means for determining the intensity of the reflected radiation at a pre-determined set of wavelengths, the intensity of the reflected radiation in the set of wavelengths so determined providing a signature for classification of the particular sample, means for classifying the sample into one of a set of categories on the basis of the signature thus obtained, the means for classifying being computer means which accepts signatures obtained from a set of test samples and produces, using methods of pattern recognition, a classifying program for identifying the category to which each test signature belong, classifying means, the classification means further including means for processing the signature from an unknown sample with the same program thereby to classify the unknown sample.

14. Apparatus as claimed in claim 13 in which the computer means is a general-purpose digital computer.

15. Apparatus as claimed in claim 14 in which the computer means for classifying the set of test signatures is a general-purpose digital computer and in which the means for processing the signature from an unknown sample is an analog circuit operable to carry out in analog circuitry the mathematical calculation performed in the classifying program.

16. A method of classifying an unknown sample as belonging to one of a set of categories, that comprises, directing infrared radiation upon the same which reflects at least a portion of such radiation as a diffuse and/or specular reflection, collecting the reflected radiation, determining the intensity of the collected radiation at each wavelength of a predetermined set of wavelengths, converting the intensity at each said wavelength to a voltage signal indicative of the intensity at each said wavelength, storing the voltage signal representative of the intensity at each said wavelength to provide a set of signals which together constitute a signature for classification of the particular sample, and classifying the sample into one of a set of categories on the basis of the signature thus obtained.

* * * * *

UNITED STATES PATENT OFFICE

CERTIFICATE OF CORRECTION

Patent No. 3,747,755 Dated: July 24, 1973

Senturia et al.

It is certified that error appears in the above-described patent and that said Letters Patent are hereby corrected as shown below:

Correct the spelling of the surname of the last named inventor to read:--Winkler--.

Signed and sealed this 23rd day of April 1974.

(SEAL)
Attest:

EDWARD M.FLETCHER,JR.
Attesting Officer

C. MARSHALL DANN
Commissioner of Patents